UNITED STATES PATENT OFFICE.

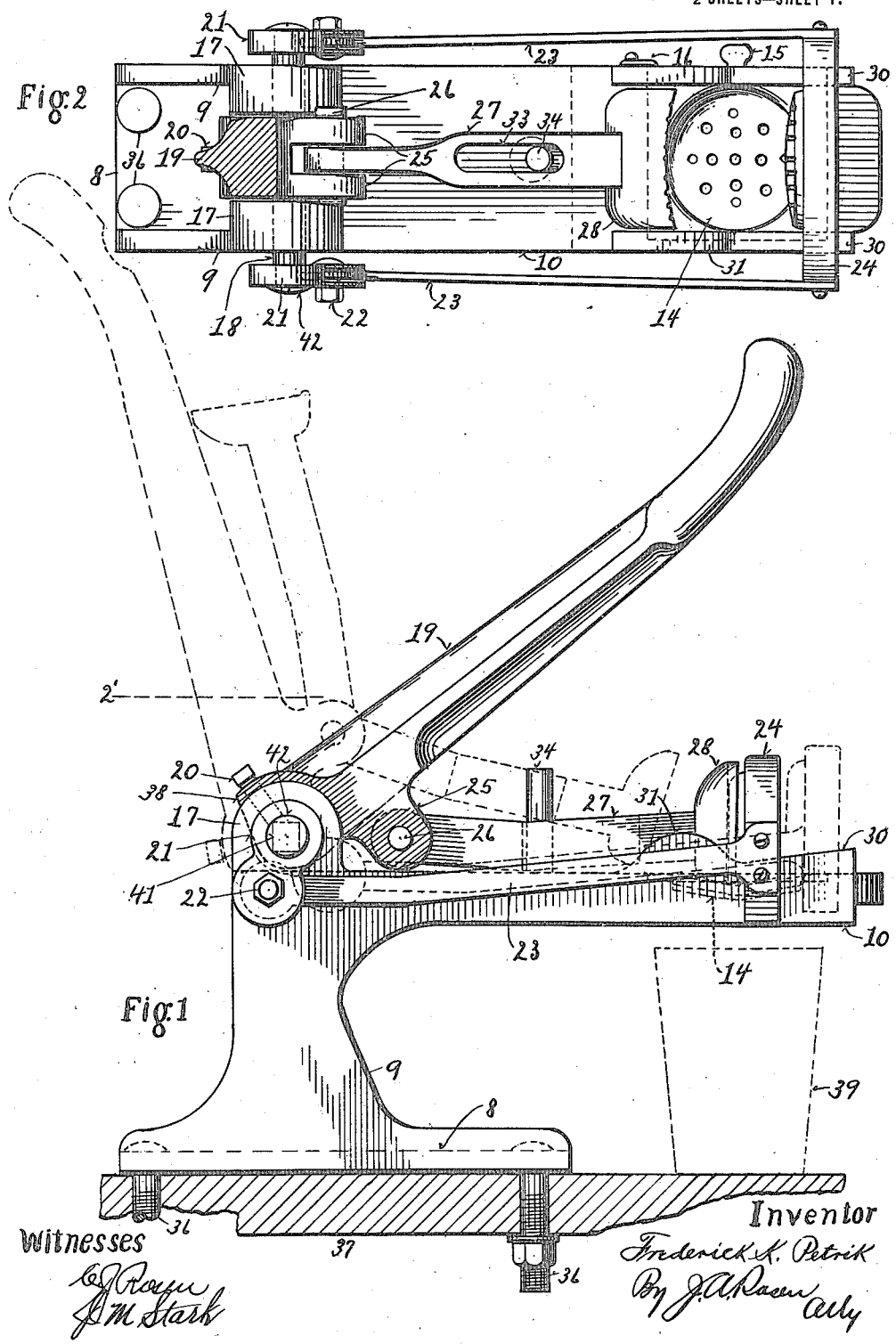

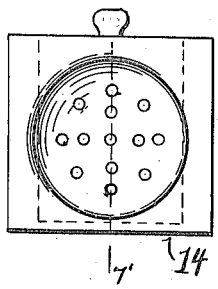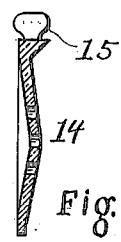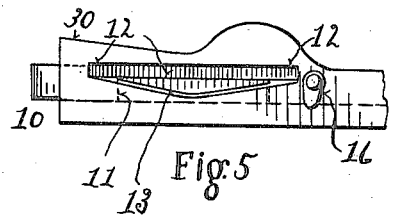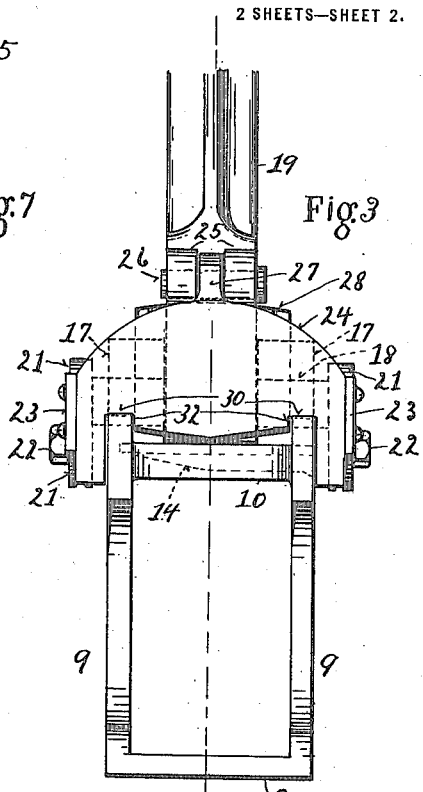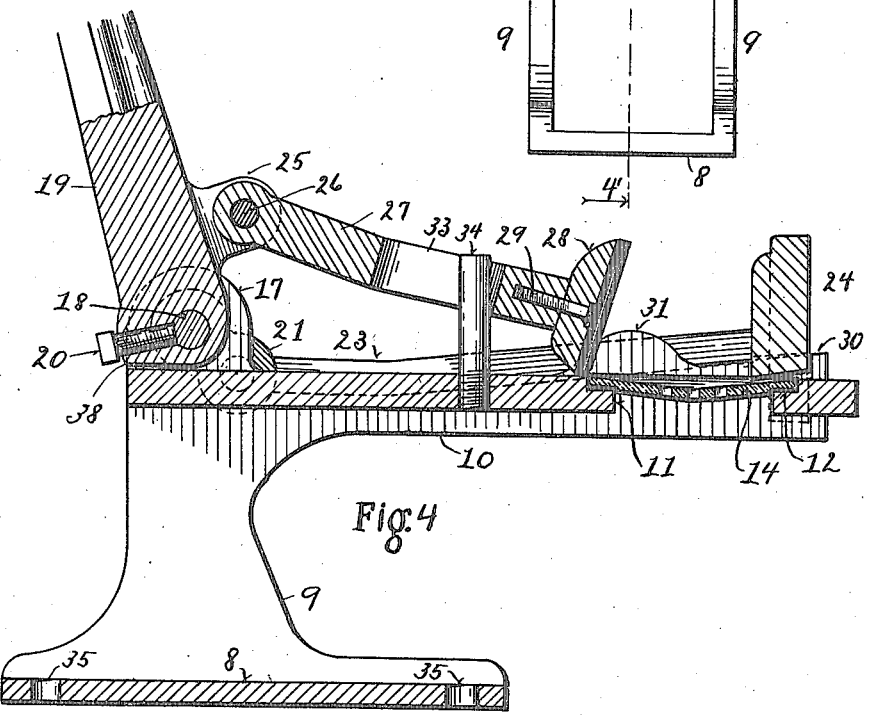

FREDERICK K. PETRIK, OF TOPEKA, KANSAS.

LIME AND LEMON SQUEEZER.

1,197,231. Specification of Letters Patent. Patented Sept. 5, 1916.

Application filed August 21, 1915. Serial No. 46,666.

*To all whom it may concern:*

Be it known that I, FREDERICK K. PETRIK, a citizen of the United States, residing at Topeka, in the county of Shawnee and State of Kansas, have invented certain new and useful Improvements in Lime and Lemon Squeezers, of which the following is a specification.

My invention is generally applicable to the expressing of the juice from limes and lemons; but it is designed more particularly for commercial use, that is, for soda fountains and other dispensaries.

The object is to provide a simply constructed and operated, strong, durable, sanitary, and efficient lime and lemon squeezer, capable of great compression, and having the parts so arranged that they are easily accessible for purposes of cleaning and replacement, and in which those parts with which the fruit and juices come in contact may be of material especially suitable, such as glass or porcelain. Special attention is given to the arrangement of the compressing devices with relation to the strainer in that, though the fruit, while being compressed, is in close relation to or rests upon the strainer, yet there is almost no pressure against the strainer.

My invention consists of the certain parts, improvements, and combinations involved in such arrangement as hereinafter set forth and claimed.

In the drawings accompanying and forming part of this specification and in the description of the drawings, I have shown my invention in its preferred form and what I deem to be the best mode of applying the principles thereof; but it is to be understood that within the scope of the appended claims, I contemplate changes in form, proportions, and materials, the transposition of parts, and the substitution of equivalent members, without departing from the spirit of my invention.

Figure 1 is a side elevation of a lime and lemon squeezer made in accordance with the principles of my invention, the action of the compressing elements being shown in dotted outlines. Fig. 2 is a plan view, the operating lever being shown in section on a plane indicated by the line 2' in Fig. 1. Fig. 3 is an end elevation. Fig. 4 is a vertical central sectional elevation, the plane of the section being indicated by the line 4' in Fig. 3. Fig. 5 is a view of one side of the end of the strainer-supporting arm, this side being opposite to that shown in Fig. 1, and the strainer and other parts being removed. Fig. 6 is a plan of the strainer. Fig. 7 is a section of the strainer on a plane indicated by the line 7' in Fig. 6.

Similar reference characters indicate similar parts throughout the several views.

A suitable standard is formed with a rather broad base 8, legs 9, 9, upwardly projecting bearing lugs 17, 17, and a laterally extending strainer-supporting arm 10. The base is formed with bolt-holes 35, 35, through which may be extended the bolts 36, 36, for securing the standard rigidly to a suitable support 37, which may be a counter, bar, or any other support. The strainer-supporting arm preferably projects somewhat beyond the base and is high enough above the support 37 to accommodate thereunder a glass 39 on the support 37, as will be presently explained. The strainer-supporting arm is formed with an opening 11, around the three sides of which is formed a ledge 12, and through one side is an opening 13, for the insertion, reception, and removal of the strainer 14, which is formed with a handle 15.

16 is a button pivoted to the side of the arm for holding the strainer in place.

Having bearings in the bearing lugs 17, 17, is the main pivot pin or bolt 18, to which, between the lugs, is rigidly secured the operating lever 19, and to the outer ends of which are rigidly secured the arms 21, 21; so that the lever 19, the bolt 18, and the arms 21, 21 oscillate together. The lever may be secured to the bolt by means of a set-screw 20, and the arms 21, 21 by angular engagement, as indicated at 41 (Fig. 1), and cap-screws 42, 42.

Each of the links 23, 23 is pivotally secured by means of a pivot pin or bolt 22 to one of said arms 21, 21, and rigidly secured to the presser plate 24, which spans the outer end of the strainer-supporting arm above the strainer. The lever 19 is formed with two laterally projecting lugs 25, 25, to which and between which is pivoted the rod 27 by means of a pivot pin or bolt 26. This rod carries, rigidly secured to it a presser plate 28, which is intended to work in opposition to the plate 24 to compress the fruit above the strainer. This plate 28 may be formed integrally with the rod or plunger 27 or it may be detachably secured thereto as by means of a screw 29. On opposite sides of the outer end of the strainer-supporting arm are ribs having upper surfaces 30, 30, on which ride the plate 24 which is cut away for this purpose as shown at 32, 32 (Fig. 3), and these surfaces are preferably inclined to correspond approximately with the slant of the strainer, so that the plate may ride on the surfaces 30, 30 without directly bearing against the strainer, yet following the depression in the strainer. The ribs also serve the purpose of preventing the accidental discharge of the juice over the sides, and for this reason are continued, as indicated at 31, 31, alongside of the other plate 28. The rod 27 may be formed with a slot 33 working around a pin 34, to limit the movement of the parts. The movement is also limited by engagement of the lugs 25, 25, and the shoulder 38, respectively, with the arm 10 or standard.

As will be noted in the drawings, the strainer is horizontally disposed, and the compressing plates move horizontally in general direction toward and away from each other above the strainer. The dotted outlines in Fig. 1 and the full outlines in Figs. 2, 3, and 4 show the parts in their positions ready to receive the half lime or lemon, which is placed on the strainer with its cut side down. In this position, the operating lever is thrown back over its center line so that it is held there by gravity, and the presser plates are spread apart from each other sufficiently to receive the fruit between them on the strainer. On moving the lever toward the position shown in full outlines in Fig. 1, the plates are caused to move simultaneously toward each other and toward the middle of the strainer (their extreme movement, in the absence of obstacle, being such as to bring them together approximately above the center of the strainer, as indicated in Fig. 1), the result being to compress the fruit between the plates, pressing out the juice, which flows through the strainer which retains the seeds and fiber. The movement of the presser plates in opposition to each other is accomplished by having the pivots 22 and 26 on opposite sides of the main pivot 18. The expressing of the juice is also facilitated by giving to the pivot 26 more of a vertical movement, which causes the plate 28 to meet the fruit with a slightly oscillating movement as well as horizontal movement, thus compressing more at the top at first.

The main parts may be made of suitable metal, the operating lever being preferably quite strong and rather heavy to give it both the appearance and the "feel" of strength. The strainer may be made of glass or porcelain or any suitable material best adapted for cleansing and least likely to be affected by the fruit or its juices. Inasmuch, however, as the materials best adapted to answer these requirements, is usually frangible, as glass and porcelain, it is an important feature of my invention that though my device is capable of great compressive force, none of the stress of the compression is exerted against the strainer, except such slight stress as I have intended to hold the fruit down against the strainer. Also the plates themselves may be provided with separate faces of material best adapted for their purposes. After effecting the expressing of the juice the lever is again thrown back, and the remnants of the fruit removed. The strainer may be easily removed for thorough cleaning, from time to time, and the links, plates and rod 27 may also be thrown back against the lever to give access to the parts immediately surrounding the strainer, so it can be easily kept clean.

Having thus described my invention, what I claim as new and desire to secure by Letters Patent is:

1. The combination of a standard formed with a base adapted to be secured to a suitable support, with a laterally extending strainer-supporting arm, and with bearing lugs projecting above said arm; a horizontally disposed strainer removably supported on said arm, a lever fulcrumed in said bearing lugs, a plunger-rod pivoted to said lever above the fulcrum, links pivoted to said lever below said fulcrum, and presser plates secured to the plunger-rod and the links, respectively, above the strainer, the lever imparting reciprocating motion to the presser plates above the strainer.

2. The combination with a standard formed with a base adapted to be secured to a suitable support, with a laterally extending strainer-supporting arm, and with bearing lugs projecting above said arm; of a horizontally disposed strainer removably supported on said arm, a lever fulcrumed in said bearing lugs, links pivoted to said lever below the fulcrum and on opposite sides respectively of the said arm, a presser plate secured to and between said links above the strainer and movably supported on said arm, a plunger-rod pivoted to said lever above said arm, and a presser plate secured to said rod above said strainer; said lever being adapted to impart reciprocating motion to said presser plates above the strainer, and the motion of said plates being in respectively opposite directions.

3. The combination of a standard formed with a laterally extending strainer-supporting arm, a horizontally disposed strainer removably supported on said arm, a lever fulcrumed in said standard, presser plates having reciprocating motion in respectively opposite directions above the strainer, and a plunger-rod and links connecting the respective presser plates to the lever above and below the fulcrum respectively and whereby oscillation of the lever imparts said reciprocating motion to said presser plates.

4. The combination of a frame, a horizontally disposed strainer supported thereon, a lever fulcrumed in the frame, a pair of presser plates having substantially horizontal motion toward and away from each other above said strainer, and suitable connections between the respective presser plates and the lever for imparting to said plates said reciprocating motion.

In testimony whereof I have affixed my signature in the presence of two witnesses.

FREDERICK K. PETRIK.

Witnesses:
C. J. ROSEN,
J. M. STARK.